Patented Mar. 18, 1947

2,417,607

UNITED STATES PATENT OFFICE 2,417,607

COPOLYMER OF VINYL AROMATIC HYDROCARBONS

David T. Mowry, Dayton, Ohio, assignor to Monsanto Chemical Company, St. Louis, Mo., a corporation of Delaware No Drawing. Application April 26, 1944, Serial No. 532,869

8 Claims. (Cl. 260—86)

1

The present invention relates to new interpolymerization products.

An object of the present invention is to provide copolymerization products or vinyl aromatic hydrocarbons, particularly styrene, which products have improved physical strength characteristics as well as higher thermal stability than does polystyrene itself.

I have found that valuable interpolymerization products may be obtained by polymerizing a vinyl aromatic hydrocarbon such as, for example styrene, in the presence of fumarodinitrile (fumaric acid dinitrile). The present products in their clear and transparent form may be employed for the production of transparent objects such as windshields and the like, or for transparent molded articles, for insulating materials, etc. Fumarodinitrile not only copolymerizes with vinyl aromatic compounds to form interpolymers of higher heat distortation points than the polyvinyl aromatic compound itself, but it is relatively selective in its polymerizing properties because it does not itself polymerize, nor does it form copolymers with some of the highly reactive aliphatic vinyl compounds such as vinyl chloride, vinyl acetate, methyl acrylate or methyl methacrylate.

According to my discovery, fumarodinitrile is dissolved in monomeric styrene and the solution is then readily polymerized by heat to yield uniform, clear, hard, resins possessing valuable properties. Moreover, I have found that the presence of the ordinarily unpolymerizable fumarodinitrile in the monomeric mixture undergoing polymerization tends to accelerate rather than to inhibit the polymerizing reaction. Mixtures of monomeric styrene with fumarodinitrile tend to polymerize more rapidly than does styrene itself. Acordingly, lower temperatures may advantageously be employed for the polymerization of the herein described mixtures. Mixtures of styrene and fumarodinitrile are most advantageously polymerized in mass at temperatures below about 100° C., although if desired higher temperatures up to 120° C. may also be employed. However, because of the accelerating effect of fumarodinitrile on the polymerization reaction, polymerizing temperatures in the neighborhood of 50° C. to 70° C. or 80° C. may be employed, depending upon the rate of polymerization desired.

The present styrene copolymers are characterized by good resistance to organic solvents, excellent thermal stability and improved resistance to impact. In general, the copolymerization of styrene with fumarodinitrile in the proportions so as to yield from 10% to 35% of copolymerized

2 fumarodinitrile in the interpolymer results in the production of resinous products possessing an impact resistance which is substantially greater than that of polystyrene.

For the production of clear, transparent, resinous products I prefer to employ mixtures of monomeric styrene and fumarodinitrile in which mixtures the fumarodinitrile content is below approximately 50% and preferably below 35% by weight of said mixture. If one polymerizes mixtures of styrene and fumarodinitrile containing less than 30% by weight of fumarodinitrile in said mixture the resulting interpolymer initially formed contains more copolymerized fumarodinitrile than was present in the monomeric mixture. This is due to the fact that the fumarodinitrile combines with styrene to form the interpolymer in greater amounts than correspond to its concentration in the monomeric mixture. This results in the depletion of the monomeric mixture with respect to fumarodinitrile and accordingly for the production of uniform interpolymerization products it is desirable to maintain the concentration of fumarodinitrile in the mixture at a substantially constant value during polymerization.

On the other hand, polymerization of a mixture of styrene and fumarodinitrile containing more than 30% of fumarodinitrile results in the formation of interpolymers in which the content of copolymerized fumarodinitrile is less than that present in the monomeric mixture. This results in the depletion of the monomeric mixture with respect to styrene, and it is accordingly desirable for best results to maintain the concentration of the styrene in the mixture at a substantially constant value during polymerization.

The above description indicates the theoretically desirable features to be observed for the production of the more highly uniform interpolymerization products. For many purposes, however, such a high degree of uniformity as indicated above, is not required and, accordingly, a satisfactory degree of uniformity may be achieved by means of only an approximate maintenance of uniformity of concentration in the polymerizing mixture. This is particularly true for those interpolymers where the content of copolymerized fumarodinitrile is in the neighborhood of 30%. At this point the difference between the content of fumarodinitrile in the monomeric mixture and in the resulting interpolymer is at a minimum and slight deviations in either direction from the critical value of 30%, results in little change in the composition of the interpolymer. Thus, over the range of about 5% on either side of the critical 30% concentration of fumarodinitrile, that is, say, from 25% to 35% fumarodinitrile concentration in the monomeric mixture, the product, for many purposes, will be of satisfactory uniformity.

In many cases a satisfactory degree of uniformity of the interpolymer may be achieved by restricting the amount of polymer formed in the mixture of monomers. Depending upon the degree of uniformity desired, the amount of interpolymer formed in and recovered from the polymerizing mixture may be restricted to 2%, 3%, 5% or even 10% by weight of the monomeric mixture. The interpolymer may be recovered from the monomeric mixture by precipitation in alcohol, the monomers also being recovered and thereafter reused in the process. The smaller the amount of conversion to interpolymer, the greater the degree of uniformity, and vice versa. This fact is of particular value when producing interpolymers containing from 2.5% up to 25% of fumarodinitrile.

Accordingly, the method of polymerization which may be employed will depend somewhat upon the composition of the interpolymer to be produced, that is, whether the content of fumarodinitrile in the interpolymer is in the neighborhood of 30% or whether it is less or greater than 30%. Homogeneous interpolymers which contain in the neighborhood of 30% of fumarodinitrile may be produced by polymerizing monomeric mixtures containing in the neighborhood of 30% of fumarodinitrile. However, in order to produce homogeneous interpolymers containing more or less than 30% of fumarodinitrile the quantitative effect of the fumarodinitrile or the styrene present in the mixture upon the polymerization reaction, should be taken into consideration in accordance with the following experimental facts.

It has been found experimentally that the relationship between the composition of the monomeric mixture undergoing polymerization and the composition of the initial interpolymer produced is given by the following relationship:

Table 1

| Composition of monomer, by wt. | | Per cent fumarodinitrile in copolymer |
|---|---|---|
| Fumarodinitrile, per cent | Styrene, per cent | |
| 0.15 | 99.85 | 2.5 |
| 0.40 | 99.60 | 5.5 |
| 1.00 | 99.00 | 9.5 |
| 2.00 | 98.00 | 14.3 |
| 5.00 | 95.00 | 19.5 |
| 15.00 | 85.00 | 24.9 |
| 20.00 | 80.00 | 27.3 |
| 25.00 | 75.00 | 28.6 |
| 30.00 | 70.00 | 30.0 |
| 35.00 | 65.00 | 31.4 |
| 40.00 | 60.00 | 31.8 |
| 45.00 | 55.00 | 33.2 |
| 50.00 | 50.00 | 34.5 |

For the production of clear interpolymerization products of styrene and fumarodinitrile in which the fumarodinitrile content is below about 35% by weight the composition of the corresponding monomeric mixtures is taken from the above table. In carrying out a polymerization the mixtures of monomers are made in accordance with the interpolymer desired as indicated above, the mixture then being subjected to heat either with or without a polymerization catalyst and in the presence or absence of a solvent and polymerization allowed to take place in the usual way.

In order to produce a uniform interpolymer by polymerization in the absence of a solvent the mixture of monomers undergoing polymerization is preferably carried to a polymer content of at least 2% and up to 30% by weight. If a solvent for the monomers is employed the polymerization may be carried to about 70% conversion. During polymerization, the polymerizing mixture should be maintained at a uniform dinitrile concentration throughout the polymerization process. A uniform concentration is maintained by adding fumarodinitrile or styrene from time to time in order to replace that which has been combined as the interpolymer.

When the polymerization has been completed, i. e., when the mixture of monomers contains, say, from 20% to 30% by weight of copolymer the polymerization is interrupted and the polymer recovered by precipitation by pouring the polymer into alcohol and separating the unchanged monomers. It will be found that a uniform copolymer has been produced.

The following examples illustrate the process and the products obtained:

EXAMPLE 1

A mixture of monomeric styrene and fumarodinitrile containing 0.15% by weight of fumarodinitrile is made by dissolving fumarodinitrile in styrene. The mixture is subjected to polymerization in the absence of a catalyst by heating to a temperature of 50° C. to 60° C. with agitation. During the polymerization samples of the mixture are withdrawn, the content of copolymer in the mixture determined by precipitation in alcohol and the content of fumarodinitrile in the polymer determined by analysis. During the polymerization such samples are preferably taken at regular intervals and as a result of the determination of the amount and composition of the copolymer the concentration of fumarodinitrile in the monomeric styrene is adjusted to the concentration of fumarodinitrile present in the original mixture. When the determination of the copolymer content indicates that approximately 20% to 25% or 30% by weight has been reached, the entire mass is poured into alcohol and the polymer recovered. The polymer will, upon analysis, be found to contain approximately 2.5% of copolymerized fumarodinitrile. The molded material will have a heat distortion point of approximately 84° C.

EXAMPLE 2

In a manner similar to that described in Example 1 above, a monomeric mixture of styrene and fumarodinitrile containing 0.4% by weight of fumarodinitrile is polymerized. When the monomeric mixture has attained a conversion of about 20% to 25% or 30% the copolymer is recovered from the mixture and molded and will be found to have a heat distortion point in the neighborhood of 94° C. There is present in the interpolymer, approximately 5.5% of copolymerized fumarodinitrile.

EXAMPLE 3

A monomeric mixture of styrene and fumarodinitrile containing 2.4% of fumarodinitrile is polymerized as described in Example 1 above. The resinous copolymer, upon precipitation by alcohol, will be found to have a copolymerized fumarodinitrile content of 14% by weight. The resin will also be found to have a heat distortion point of about 107° C.

By conducting the polymerization of mixtures of fumarodinitrile and styrene as described above, it will be possible to produce interpolymers containing up to 30% or 35% fumarodinitrile. The relationship of the content of copolymerized fumarodinitrile in the interpolymer and the heat distortion point (A. S. T. M. method D648-41T) is given in the following Table 2:

*Table 2*

| Per cent copolymerized fumarodinitrile in interpolymer | A. S. T. M. heat distortion point, ° C. |
|---|---|
| 2.5 | 84 |
| 5.5 | 94 |
| 14.0 | 107 |
| 21.0 | 124 |
| 30.0 | 140 |

The heat distortion point of polystyrene is 76° C. to 78° C. as determined by the same method. The high heat distortion point of my new copolymers makes them suitable for use in many fields which cannot use polystyrene because of its low heat distortion point.

Polymerization may be carried out in solution in solvents which dissolve the monomers and which may also be solvents or non-solvents for the interpolymer. Solvents such as dioxane and ethylene dichloride dissolve both the monomers as well as the interpolymer. Solvents such as the lower aliphatic alcohols dissolve the monomers, whereas the interpolymer is insoluble therein. Accordingly, when the interpolymer is produced in solution in a solvent in which it is soluble, it may be recovered therefrom by pouring the solution of polymer into an alcohol such as methyl, ethyl, propyl or butyl. Polymerization may also be carried out in mass or by the emulsion method.

The solubility of the resinous interpolymer depends upon the amount of copolymerized fumarodinitrile contained therein. Interpolymers containing up to about 14% of fumarodinitrile are soluble in the aromatic hydrocarbons such as benzene, toluene, chlorinated hydrocarbons such as chloroform, carbon tetrachloride and ethylene dichloride, dioxane and acetone. They are insoluble in alcohol and gasoline.

The interpolymers containing above about 14% of copolymerized fumarodinitrile are soluble in dioxane, acetone and ethylene dichloride and are insoluble in aromatic hydrocarbons, the lower aliphatic alcohols and in chlorinated hydrocarbons other than ethylene dichloride.

The following examples, except Example 6, illustrate the production of substantially uniform interpolymers containing between 30% and 35% of fumarodinitrile by the complete polymerization of the monomeric mixture. By the methods here illustrated castings may be produced, the polymerization being carried to substantial completion in molds and castings obtained which are considerably stronger than polystyrene itself.

Example 6 shows the polymerization by emulsion methods, of a mixture containing 80% of styrene and 20% of fumarodinitrile. While such emulsion polymers can be successfully molded, they are of greater value for application to textile materials for various purposes.

EXAMPLE 4

A mixture of 65 parts of styrene and 35 parts of fumarodinitrile is polymerized by heating in the absence of a polymerizing catalyst at a temperature of 70° C. for 7 days. The product is a hard, clear, slightly yellow resin. A strip cut from a cast piece of the resin showed the following mechanical properties as compared with polystyrene:

|  | Interpolymer | Polystyrene |
|---|---|---|
| Tensile strength | 5,600 lbs./sq. in. | 6,500 lbs./sq. in. |
| Flexural strength | 12,200 lbs./sq. in. | 11,000 lbs./sq. in. |
| Impact strength | >30 (arbitrary units) | 9 (arbitrary units). |

The above value for tensile strength was determined by employing a model J-2 Scott tester and a test strip of the polymer measuring 0.08" x 0.5" x 2". The above value for flexural strength was determined by employing a test bar measuring 0.08" x 0.5" x 1.0" and a model J-2 Scott tester, which tester had been modified by a special support having curved edges with a radius of 0.0625" and spaced at a distance of 0.625", the test bar being laid flat on said supports. Evaluation of the impact strength was made by employing a modification of the cantilever beam (Izod) impact machine described in the American Society for Testing Materials, specification D256-41T and found on pages 339 to 342 of the American Society for Testing Materials, Book of Standards, 1941 supplement, volume III. The toughness of the present fumarodinitrile-styrene copolymer is evident when its impact strength is compared to that of a similarly polymerized substantially pure polystyrene. While the impact strength of the substantially pure polystyrene is only 9 arbitrary units, that of the present copolymer is over 30 arbitrary units, both values being obtained by employing the same testing procedure.

EXAMPLE 5

A mixture comprising 70 parts of styrene, 30 parts of fumarodinitrile and 15 parts of a plasticizer known to the trade as Santicizer M-17, and comprising substantially methyl phthalyl ethyl glycollate, is polymerized by heating in the absence of a polymerizing catalyst at 65° C. for 7 days. The product is a hard, clear resin of high impact strength and thermal stability. When tested by the procedures described in Example 1, in order to determine its mechanical properties the following values were obtained:

Tensile strength _____lbs./sq. in__ 6,500
Flexural strength _____lbs./sq. in__13,600
Impact strength _____(arbitrary units) __ >30

In order to compare the thermal properties of the present copolymer with those of substantially pure polystyrene, thermal data on both products were obtained, employing the Maquenne block method. The following values were obtained:

|  | Interpolymer | Polystyrene |
|---|---|---|
| Softening point, ° C | 135 | 115 |
| Melting point, ° C | 260 | 205 |
| Decomposition point, ° C | >280 | 210 |

In molding, a test specimen had a Rossi-Peakes flow of 0.35 inch in 2 minutes at a pressure of 500 lbs./sq. in. and a temperature of 275° F. Styrene, alone, containing the same amount of plasticizer, but no copolymerizing compound, would give a polymer of greatly inferior strength and thermal properties under the same conditions.

Example 6

64 g. of a mixture comprising 20 parts of fumarodinitrile and 80 parts of styrene are emulsified to a fine milk in a mixture comprising 37.5 ml. of an aqueous solution of mono- and disodium orthophosphates adjusted to a pH of 6 or slightly less, 37.5 ml. of a 5% aqueous solution of Gardinol WA, (lauryl sodium sulfate) 0.5 g. of sodium perborate, and 1.5 g. of carbon tetrachloride and the emulsion is shaken at a temperature of 35° C. until polymerization has been effected. The emulsion is then broken by pouring it into alcohol and the precipitated polymer is filtered, washed with water and dried. Alternatively the emulsion may be broken with an electrolyte solution. The product is a white powder having a softening point of 160° C. and a melting point of 265° C. Test pieces molded from the polymer were insoluble in gasoline and carbon tetrachloride. Analysis of the polymer gave a nitrogen content of 8.33% as against 7.2%, the calculated amount for a 1:4 fumaronitrile-styrene copolymer. A yield indicating 95% polymerization of the initial mixture was obtained.

Example 7

A mixture comprising 9 g. of fumaronitrile and 21 g. of styrene is dissolved in 270 g. of a solvent such as 1,4-dioxane and the solution is heated at 80° C. for 6 days. At the end of this time the solution is poured into 10 volumes of ethanol, the precipitated polymer is filtered, air-dried for one hour and then dried at a temperature of 60° C. in a vacuum oven for 24 hours. There is thus obtained 19.5 g. of a very light yellow powder having a softening point of 170° C. and a melting point of >230° C. Analysis of the polymer gave a nitrogen content of 10.5% as against 10.7%, the calculated amount for a 3:7 fumarodinitrile-styrene copolymer. The polymer is completely insoluble in alcohol and benzene and soluble in 1,4-dioxane.

Example 8

A mixture comprising 140 g. of styrene, 60 g. of fumarodinitrile and 30 g. of a plasticizer known to the trade as Santicizer B-16 (butyl phthalyl butyl glycollate) is polymerized by heating at a temperature of 80° C. for 5 days and at 120° C. for one day. The resulting hard, clear resin is ground to a powder and then rolled employing a front roll temperature of 315° F., back roll temperature of 230° F. for a time of 10 minutes. Molded specimens made from the rolled product have been found to have the following characteristics when tested according to the procedures described in Example 1:

Tensile strength _____ lbs./sq. in __ 7,300
Flexural strength _____ lbs./sq. in __ 16,800
Impact strength _____ (arbitrary units) __ 12
Softening point _____ °C __ 150
Melting point _____ °C __ 250
Solubility _____ Insoluble in benzene or carbon tetrachloride

Example 9

A mixture comprising 70 parts of styrene and 30 parts of fumarodinitrile was polymerized between parallel glass plates using a pure gum rubber spacer-container having adjustable screw clamps at the edges for holding the glass plates tightly against the spacer. Polymerization is carried out essentially in the dark at a temperature of 70° C. for four days. The cast sheet of resin thus obtained was clear, uncracked and smooth and may be employed as a safety glass.

A sheet of the cast styrene-fumarodinitrile copolymer may be bent into a semi-circular form by heating it above its softening point. This shape is retained by the sheet upon cooling and there is no sign of relaxation in the bent piece even after prolonged storage.

The herein described interpolymers are resistant to acids and alkalies, that is, there is no tendency of the dinitrile groups in the interpolymer to hydrolyze, even when refluxed for eight hours with 9.5 N NaOH. The present products are insoluble in dilute or concentrated acids or in dilute or concentrated aqueous alkali. They are free from carboxy groups and also salt groups. In this respect they differ from the heteropolymers formed by the polymerization of styrene and maleic anhydride, or related alpha, beta-ethylene dicarboxylic acids, anhydrides or acid chlorides. The present products may, accordingly, be employed for the production of a great variety of cast and molded objects. Interpolymers containing below about 20% of fumarodinitrile may be injection molded by the ordinary injection molding technique, interpolymers containing between 5% and 20% by weight of copolymerized fumarodinitrile being particularly suitable for injection molding operations. Interpolymers containing between about 20% of fumarodinitrile and up to 35% of fumarodinitrile may be compression molded.

In order to injection mold the herein described interpolymers it has been found that the temperature for molding a 14% fumarodinitrile interpolymer compares with the molding temperature of polystyrene as follows:

| Interpolymer (86% styrene—14% fumarodinitrile) | Polystyrene |
|---|---|
| | ° F. |
| Cylinder temperature, 370°–450° F. | 400–450 |
| Mold temperature, 170°–250° F. | 150 |

Although the heat distortion value and mechanical strength are considerably higher than for polystyrene, actually the molding conditions are no more difficult than for polystyrene.

Because of the excellent thermal and physical properties of the present interpolymers they are valuable for the production of extruded, cast or molded parts for the following purposes:

Electrical insulation, particularly ignition and lighting fixtures for automotive and aeronautical purposes, also switches, sockets, lamp housings, commutators, telephone parts, such as hand sets and bases, flashlight cases, lampshades, vacuum cleaners, electrical shavers, refrigerator parts, hair dryers, rectifiers, transformers, rheostats, voltage regulators, etc., steering wheels, decorative parts, knobs and handles, radio parts, such as molded cases, plugs, adapters, coil forms, coaxial cable spacers, condensers, panel boards, high frequency lead-ins, antenna loops and bases, radar domes and fibrous insulation therefor, dental and surgical instruments and dentures, printing plates, photographic films, trays, spinnerets and spinning buckets, travelers, thread guides and shuttles for weaving and spinning, pumps, chemical tank lining material, gaskets, optical instruments and accessories.

In place of styrene or in addition thereto, other vinyl aromatic compounds or vinyl benzene compounds may be interpolymerized with fumarodinitrile. For example, such alkyl styrene derivatives as ortho, para and meta, methyl, ethyl or propyl styrene; the nuclearly substituted halogen and polyhalogen derivatives of styrene such as chloro, bromo, fluoro or iodostyrene; vinyl substituted polynuclear hydrocarbons such as vinyl naphthalene, etc., may be used. Illustrative examples of the halogenated styrenes are 2,5-dichlorostyrene, para-chlorostyrene, trichlorostyrene, para-fluorostyrene, and para-bromostyrene. Other hydrocarbon substituents of styrene which may be used are alpha-methylstyrene and alpha-methyl-para-alkylstyrenes.

Polymerization may be carried out in the absence of or in the presence of oxygen liberating polymerization catalysts such as benzoyl peroxides, acetyl peroxide, ammonium persulfate, etc.

For certain purposes the interpolymers may be drawn or extruded into threads or filaments. Fibrous material may be obtained by atomizing solutions of these resins in volatile solvents, under conditions whereby the solvent is evaporated and the fiber recovered in dry fibrous form. Such material serves as an ideal heat and electrical insulator, because of the absence of free carboxy or salt groups and its resistance to the action of acids and alkalies.

This application is a continuation-in-part of my application Serial No. 450,514, filed July 11, 1942.

A variety of methods may be utilized in applying the principle of my invention, and the products produced thereby, the invention being limited only by the appended claims.

What I claim is:

1. The process which comprises forming a mixture of a vinyl aromatic hydrocarbon having a single vinyl group attached to the aromatic nucleus and fumarodinitrile, said mixture containing between 0.15% and 50% by weight of fumarodinitrile, the balance thereof being said vinyl aromatic hydrocarbon, and heating said mixture to form an interpolymer.

2. The process which comprises forming a solution of a mixture of styrene and fumarodinitrile, said mixture containing between 0.15% and 50% by weight of fumarodinitrile, the balance thereof being styrene, and heating said mixture to form an interpolymer.

3. A resinous material comprising an interpolymer of styrene and fumarodinitrile, said interpolymer containing between 2.5% and 35% by weight of copolymerized fumarodinitrile, the balance thereof being copolymerized styrene.

4. A plastic material moldable by injection methods, which consists of an interpolymer of styrene and fumarodinitrile, said interpolymer containing between 2.5% and 20% by weight of copolymerized fumarodinitrile.

5. A resinous material comprising an interpolymer of fumarodinitrile and a monovinyl aromatic compound wherein the vinyl group is attached to the aromatic nucleus, said interpolymer containing between 2.5% and 35% by weight of copolymerized fumarodinitrile, the balance thereof being copolymerized vinyl aromatic compound.

6. A resinous material comprising an interpolymer of styrene and fumarodinitrile, said interpolymer containing between 10% and 20% by weight of copolymerized fumarodinitrile, the balance thereof being copolymerized styrene.

7. An interpolymer of styrene and fumarodinitrile, said interpolymer consisting of approximately 30% by weight of copolymerized fumarodinitrile, the balance thereof being copolymerized styrene.

8. The process which comprises forming an aqueous emulsion of a mixture of fumarodinitrile and styrene, said mixture containing between 0.15% and 50% by weight of fumarodinitrile, the balance being styrene and heating said emulsion to form an interpolymer.

DAVID T. MOWRY.

REFERENCES CITED

The following references are of record in the file of this patent:

UNITED STATES PATENTS

| Number | Name | Date |
|---|---|---|
| 2,324,426 | Robie | July 13, 1943 |

FOREIGN PATENTS

| Number | Country | Date |
|---|---|---|
| 814,093 | French | Mar. 8, 1937 |